United States Patent
Prakash et al.

(10) Patent No.: US 11,564,129 B2
(45) Date of Patent: Jan. 24, 2023

(54) CONTEXT IDENTIFIER FOR PACKET COMPRESSION

(71) Applicant: QUALCOMM Incorporated, San Diego, CA (US)

(72) Inventors: Rajat Prakash, San Diego, CA (US); Vinay Joseph, Calicut (IN)

(73) Assignee: QUALCOMM INCORPORATED, San Diego, CA (US)

( * ) Notice: Subject to any disclaimer, the term of this patent is extended or adjusted under 35 U.S.C. 154(b) by 43 days.

(21) Appl. No.: 16/948,997

(22) Filed: Oct. 8, 2020

(65) Prior Publication Data

US 2021/0112450 A1 Apr. 15, 2021

Related U.S. Application Data

(60) Provisional application No. 62/914,145, filed on Oct. 11, 2019.

(51) Int. Cl.
*H04W 28/06* (2009.01)
*H04L 69/22* (2022.01)
*H04L 69/04* (2022.01)

(52) U.S. Cl.
CPC .......... *H04W 28/065* (2013.01); *H04L 69/04* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 5,825,830 A | * | 10/1998 | Kopf | H03M 7/48 358/1.9 |
| 2002/0085631 A1 | * | 7/2002 | Engwer | H04B 1/66 375/240 |
| 2004/0037317 A1 | * | 2/2004 | Zalitzky | H04B 3/54 370/466 |
| 2010/0172375 A1 | * | 7/2010 | Rochon | H04L 69/04 370/474 |
| 2014/0355516 A1 | * | 12/2014 | Baudoin | H04L 69/22 370/316 |
| 2019/0289286 A1 | * | 9/2019 | Kitamura | H04N 19/137 |

FOREIGN PATENT DOCUMENTS

WO 2011057154 A1 5/2011

OTHER PUBLICATIONS

Partial International Search Report—PCT/US2020/070647—ISA/EPO—dated Jan. 22, 2021.

(Continued)

*Primary Examiner* — Lonnie V Sweet
(74) *Attorney, Agent, or Firm* — Kevin T. Cheatham (57) ABSTRACT

Various aspects of the present disclosure generally relate to wireless communication. In some aspects, a transmitter device may determine whether a packet, to be transmitted by the transmitter device, is compressed; generate a header for transmission of the packet based at least in part on the determination, wherein the header includes a context identifier indicating whether the packet is compressed; and transmit the packet and the header. Numerous other aspects are provided.

19 Claims, 8 Drawing Sheets

(56) References Cited

OTHER PUBLICATIONS

3GPP TS 38.323: "3rd Generation Partnership Project, Technical Specification Group Radio Access Network, NR, Packet Data Convergence Protocol (PDCP) Specification (Release 15)", 3GPP Standard, Technical Specification, 3rd Generation Partnership Project (3GPP), Mobile Competence Centre, 650, Route Des Lucioles, F-06921 Sophia-Antipolis Cedex, France, vol. RAN WG2, No. V15.6.0, Jun. 28, 2019 (Jun. 28, 2019), pp. 1-26, XP051754452, [retrieved on Jun. 28, 2019] p. 24.
International Search Report and Written Opinion—PCT/US2020/070647—ISA/EPO—dated Mar. 23, 2021.
QUALCOMM Incorporated: "Principles for Ethernet Header Compression", 3GPP TSG-RAN WG2 Meeting #107, 3GPP Draft; R2-1910764, Principles for Ethernet Header Compression, 3rd Generation Partnership Project (3GPP), Mobile Competence Centre; 650, Route Des Lucioles; F-06921 Sophia-Antipolis Cedex ; FRAN vol. RAN WG2, No. Prague, Czech Republic; Aug. 26, 2019-Aug. 30, 2019, Aug. 16, 2019 (Aug. 16, 2019), pp. 1-7, XP051768532, Retrieved from the Internet: URL: http://www.3gpp.org/ftp/tsg_ran/WG2_RL2/TSGR2_107/Docs/R2-1910764.zip [retrieved on Aug. 16, 2019].

\* cited by examiner

CONTEXT IDENTIFIER FOR PACKET COMPRESSION

CROSS-REFERENCE TO RELATED APPLICATION

This Patent Applications claims priority to U.S. Provisional Patent Application No. 62/914,145, filed on Oct. 11, 2019, entitled "CONTEXT IDENTIFIER FOR ETHERNET PACKET COMPRESSION," and assigned to the assignee hereof. The disclosure of the prior Applications is considered part of and is incorporated by reference into this Patent Applications.

FIELD OF THE DISCLOSURE

Aspects of the present disclosure generally relate to wireless communication and to techniques and apparatuses for a context identifier for packet compression.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipments (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a transmitter device, may include determining whether a packet, to be transmitted by the transmitter device, is compressed; generating a header for transmission of the packet based at least in part on the determination, wherein the header includes a context identifier indicating whether the packet is compressed; and transmitting the packet and the header.

In some aspects, a method of wireless communication, performed by a receiver device, may include receiving a packet associated with a header; determining, based at least in part on a context identifier of the header, whether the packet is compressed; and processing the packet based at least in part on the determination.

In some aspects, a method of wireless communication, performed by a wireless communication device, may include generating a packet associated with a header, wherein the header includes a bit value indicating that the header is associated with a control operation and a context identifier indicating a context associated with the packet; and transmitting the packet.

In some aspects, a transmitter device for wireless communication may include memory and one or more processors operatively coupled to the memory. The memory and the one or more processors may be configured to determine whether a packet, to be transmitted by the transmitter device, is compressed; generate a header for transmission of the packet based at least in part on the determination, wherein the header includes a context identifier indicating whether the packet is compressed; and transmit the packet and the header.

In some aspects, a receiver device for wireless communication may include memory and one or more processors operatively coupled to the memory. The memory and the one or more processors may be configured to receive a packet associated with a header; determine, based at least in part on a context identifier of the header, whether the packet is compressed; and process the packet based at least in part on the determination.

In some aspects, a wireless communication device for wireless communication may include memory and one or more processors operatively coupled to the memory. The memory and the one or more processors may be configured to generate a packet associated with a header, wherein the header includes a bit value indicating that the header is associated with a control operation and a context identifier indicating a context associated with the packet; and transmit the packet.

In some aspects, a non-transitory computer-readable medium may store one or more instructions for wireless communication. The one or more instructions, when executed by one or more processors of a transmitter device, may cause the one or more processors to: determine whether a packet, to be transmitted by the transmitter device, is compressed; generate a header for transmission of the packet based at least in part on the determination, wherein the header includes a context identifier indicating whether the packet is compressed; and transmit the packet and the header.

In some aspects, a non-transitory computer-readable medium may store one or more instructions for wireless communication. The one or more instructions, when executed by one or more processors of a receiver device, may cause the one or more processors to: receive a packet associated with a header; determine, based at least in part on a context identifier of the header, whether the packet is compressed; and process the packet based at least in part on the determination.

In some aspects, a non-transitory computer-readable medium may store one or more instructions for wireless communication. The one or more instructions, when executed by one or more processors of a wireless communication device, may cause the one or more processors to: generate a packet associated with a header, wherein the header includes a bit value indicating that the header is associated with a control operation and a context identifier indicating a context associated with the packet; and transmit the packet.

In some aspects, an apparatus for wireless communication may include means for determining whether a packet, to be transmitted by the apparatus, is compressed; means for generating a header for transmission of the packet based at least in part on the determination, wherein the header includes a context identifier indicating whether the packet is compressed; and means for transmitting the packet and the header.

In some aspects, an apparatus for wireless communication may include means for receiving a packet associated with a header; means for determining, based at least in part on a context identifier of the header, whether the packet is compressed; and means for processing the packet based at least in part on the determination.

In some aspects, an apparatus for wireless communication may include means for generating a packet associated with a header, wherein the header includes a bit value indicating that the header is associated with a control operation and a context identifier indicating a context associated with the packet; and means for transmitting the packet.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
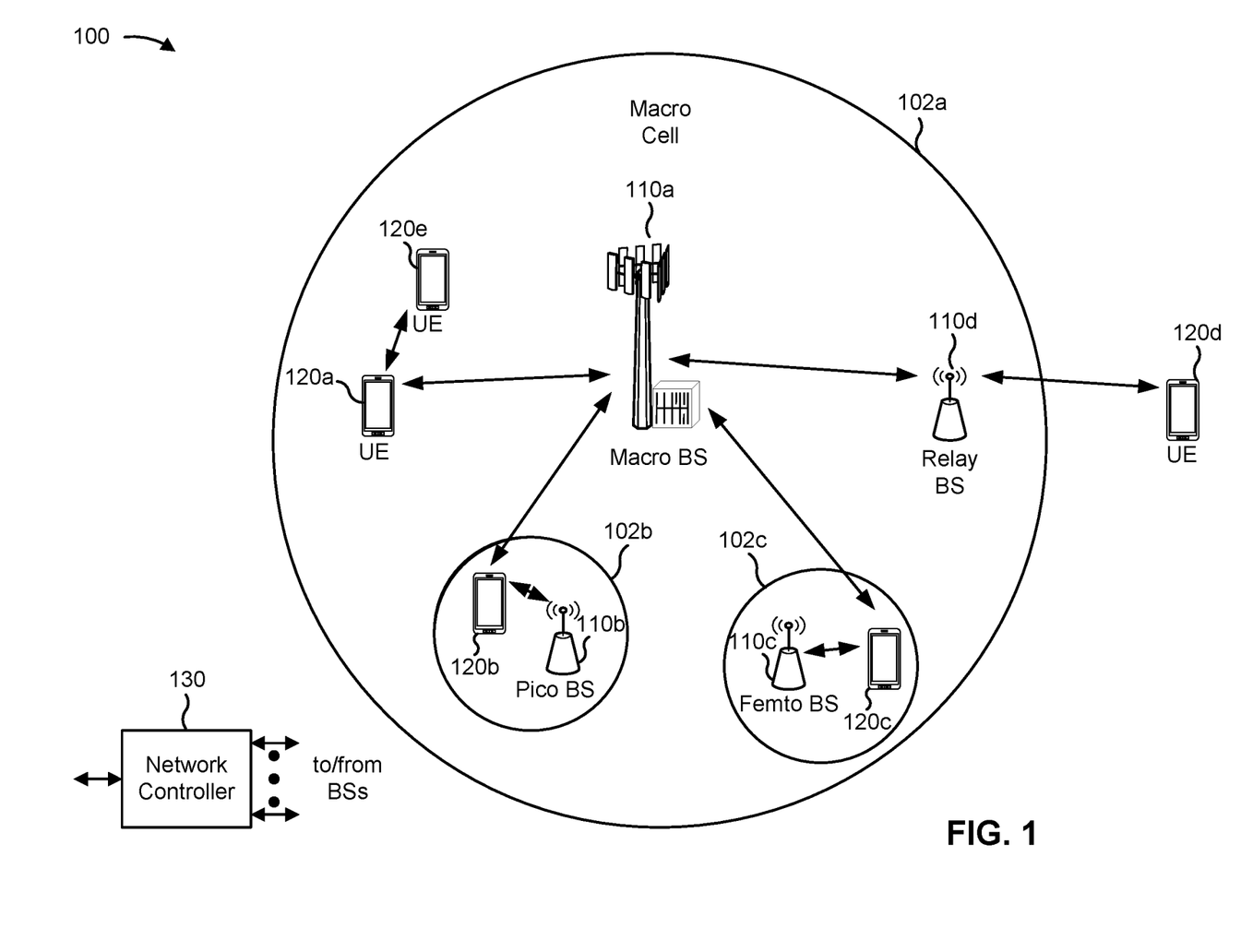
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
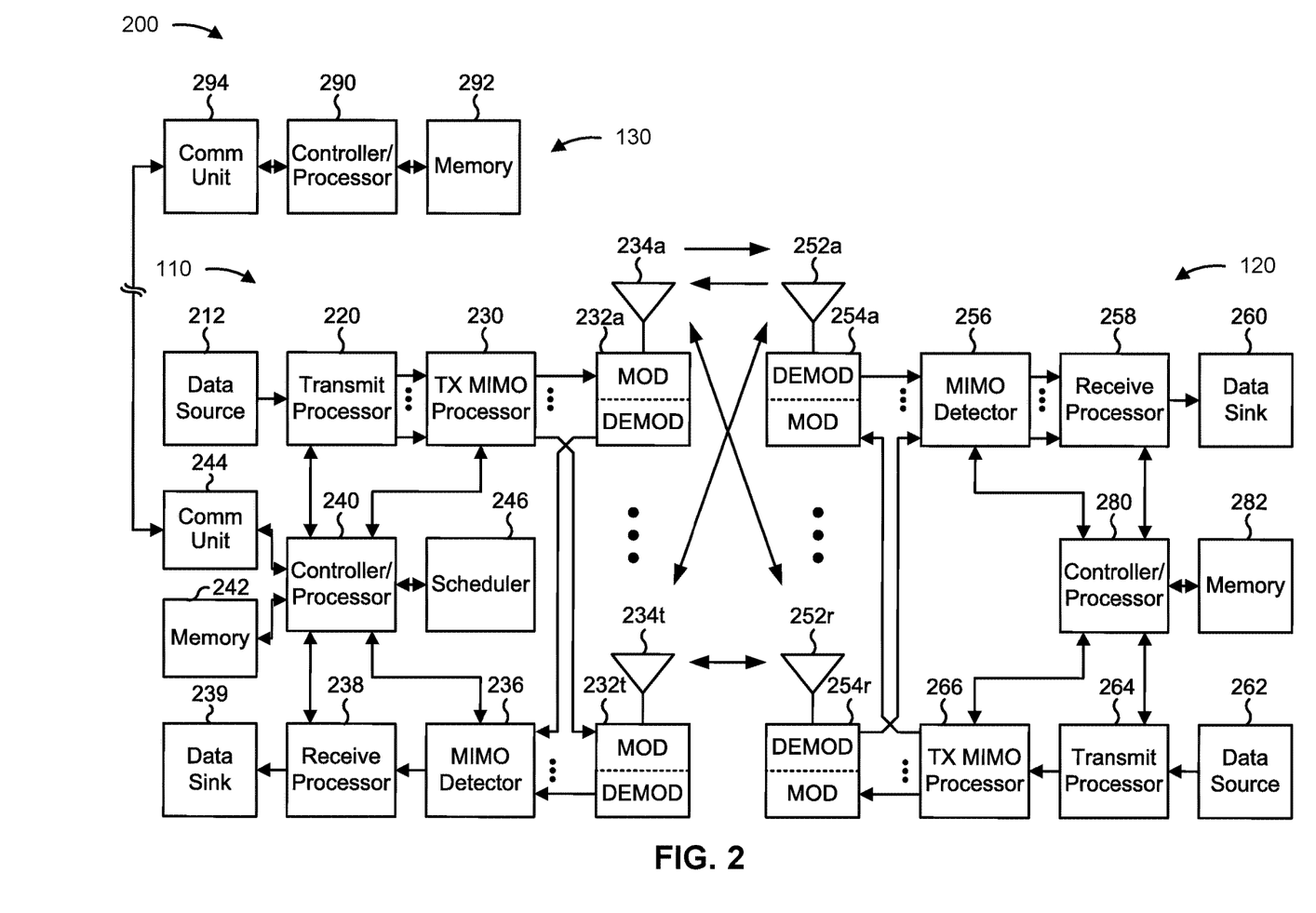
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a context identifier for Ethernet packet compression, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, process 800 of FIG. 8, and/or other processes as described herein. A scheduler 246 may schedule UEs for data transmission on the downlink and/or uplink.

In some aspects, a transmitter device may include means for determining whether a packet, to be transmitted by the transmitter device, is compressed; means for generating a header for transmission of the packet based at least in part on the determination, wherein the header includes a context identifier indicating whether the packet is compressed; means for transmitting the packet and the header; means for determining, prior to determining whether the packet is compressed, whether the header is to be associated with a control operation or a non-control operation; means for generating the header including a bit value indicating whether the header is associated with the control operation or the non-control operation; and/or the like. In some aspects, such means may include one or more components of UE 120 or BS 110 described in connection with FIG. 2, such as controller/processor 280, transmit processor 264, TX MIMO processor 266, MOD 254, antenna 252, DEMOD 254, MIMO detector 256, receive processor 258, antenna 234, DEMOD 232, MIMO detector 236, receive processor 238, controller/processor 240, transmit processor 220, TX MIMO processor 230, MOD 232, and/or the like.

In some aspects, a receiver device may include means for receiving a packet associated with a header; means for determining, based at least in part on a context identifier of the header, whether the packet is compressed; means for processing the packet based at least in part on the determination; means for determining whether the header is associated with a control operation or a non-control operation based at least in part on a bit value, included in the header, indicating whether the header is associated with the control operation or the non-control operation; means for performing the control operation or the non-control operation; and/or the like. In some aspects, such means may include one or more components of base station 110 or UE 120 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, a wireless communication device may include means for generating a packet associated with a header, wherein the header includes a bit value indicating that the header is associated with a control operation and a context identifier indicating a context associated with the packet; means for transmitting the packet; means for receiving, prior to transmitting the first packet, a second packet, wherein the second packet indicates the context setup or the context deletion; and/or the like. In some aspects, such means may include one or more components of base station 110 or UE 120 described in connection with FIG. 2, such as controller/processor 280, transmit processor 264, TX MIMO processor 266, MOD 254, antenna 252, DEMOD 254, MIMO detector 256, receive processor 258, antenna 234, DEMOD 232, MIMO detector 236, receive processor 238, controller/processor 240, transmit processor 220, TX MIMO processor 230, MOD 232, and/or the like.

As indicated above, FIG. 2 is provided as an example. Other examples may differ from what is described with regard to FIG. 2.

Some applications may involve the repetitive transmission of packets between particular devices or in particular flows. For example, in an Industrial IoT (IIoT) setting, sets of packets flowing to a particular UE may correspond to particular flows, such as a control/automation flow between a controller and a sensor/actuator, a logging or diagnostic flow between a server and a machine, a management/provisioning flow between a provisioning system and a machine, a safety flow between a safety panel and an alarm, and/or the like. For many such flows, the header of the packet may remain substantially constant for packets within a flow. In such cases, the usage of header compression may reduce the overhead associated with the flow. For example, header compression may be most beneficial for flows with small packets, such as automation flows.

One example of a header compression protocol is the Ethernet Header Compression (EHC) protocol. In the EHC protocol, the Ethernet header associated with an Ethernet payload may be removed. An EHC packet may include the Ethernet payload (e.g., an Ethernet packet from which the Ethernet header has been removed) and an EHC header, which may indicate various information about the Ethernet packet and/or may indicate a header function for a receiver device to perform. While the EHC protocol is one example of a header compression protocol, and while some of the techniques and apparatuses described herein are described in the context of the EHC protocol, the techniques and apparatuses described herein may be used for any header compression protocol.

Some packets may be uncompressed when transmitted, whereas other packets may be compressed when transmitted. For example, in some cases, it may be beneficial for a receiver device to receive an uncompressed packet and deliver the packet to a higher layer, thereby reducing resource consumption and latency associated with decompressing the packet. A compressed packet may be associated with a context (e.g., a compression context), which may indicate to a receiver device a configuration for decompressing the compressed packet. For example, a context identifier of an Ethernet Header Compression (EHC) header or another type of compression header of the compressed packet may include a context identifier that identifies the context. Some packets may be used for a control operation, such as creating a context, acknowledging the creation of a context, deleting a context, acknowledging the deletion of a context, and/or the like. In some cases, the control operations described above may be used infrequently in comparison to the transmission of a payload in a compressed packet or an uncompressed packet.

It may be beneficial to a receiver device to indicate whether a header compression packet is associated with a compressed packet, an uncompressed packet, or a control operation, in order to facilitate decompression, performance of the control operation, and/or packet handling. Furthermore, the receiver device may use the context identifier associated with the header compression to decompress the packet, where appropriate. However, a binary indication of whether or not a packet is compressed may use a bit of a header, thereby increasing overhead and reducing the number of addressable contexts. Furthermore, in addition to compressed and uncompressed packet indication, control operations may be carried out using header compression headers. In such a case, a binary indication may use two bits: a first bit to indicate whether a packet is compressed and a second bit to indicate whether the packet is associated with a control operation. This may further reduce the number of addressable contexts and/or increase overhead.

Techniques and apparatuses described herein provide for the indication of whether at least part of a packet, associated with a header compression protocol, is compressed, using a context identifier of a header compression packet. For example, a particular context identifier value may be used for uncompressed packets. Thus, a bit of a header compression header does not need to be reserved for indication of whether at least part of the packet is compressed. Furthermore, some techniques and apparatuses described herein provide indication of a control operation using a header compression header (e.g., a reserved bit and a subtype field of the header compression header), thereby enabling the provision of a payload in connection with a header of a data packet that is used for a control operation, which may not be possible for certain types of dedicated control packets, such as packet data convergence protocol (PDCP) control packets. Thus, overhead is reduced and the number of addressable contexts is increased relative to binary indication of whether the packet is compressed and/or the control operation.

Figure 3:
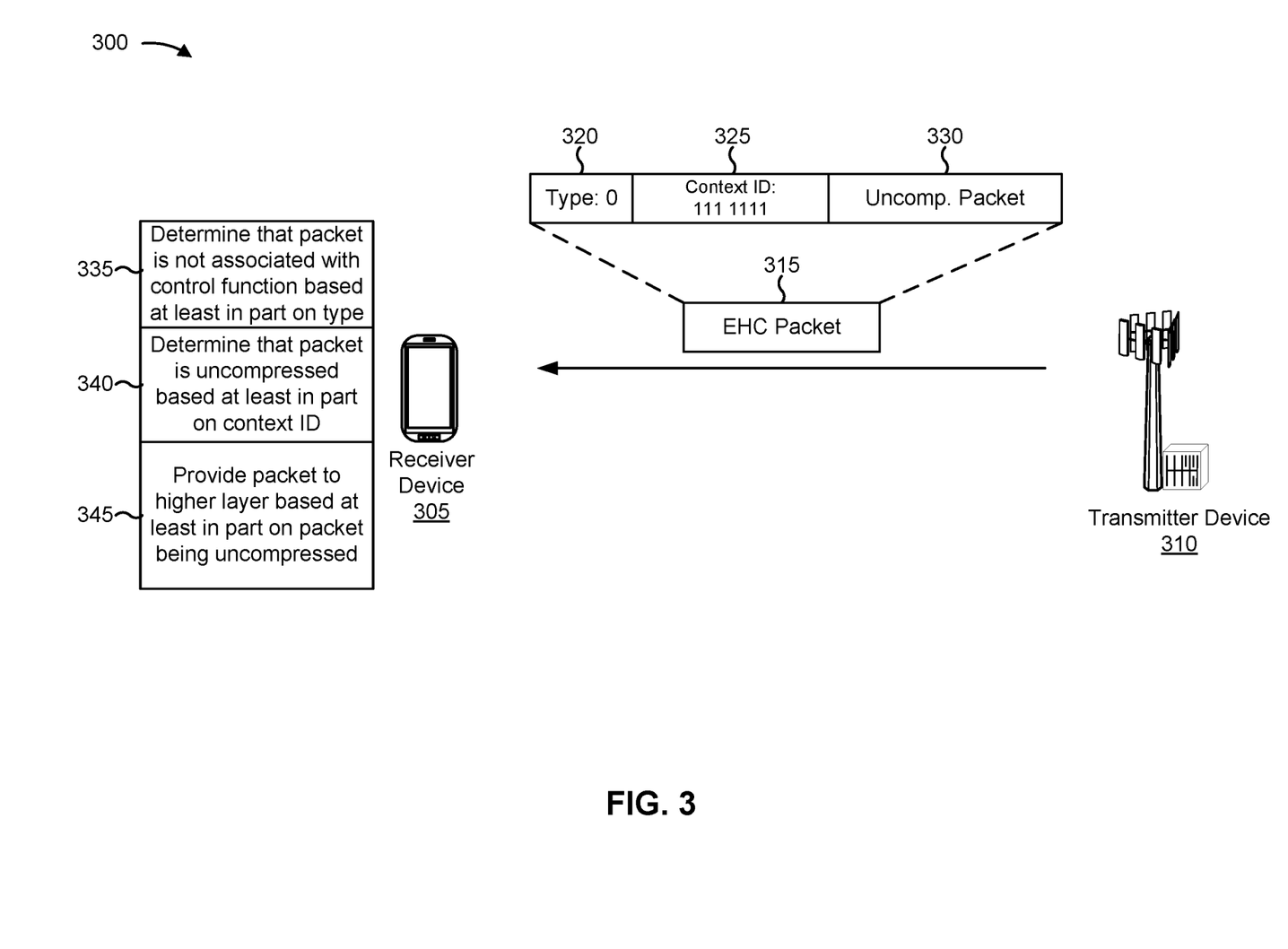
FIGS. 3-5 are diagrams illustrating examples for header compression formats for indication of compression and control operations, in accordance with various aspects of the present disclosure.
Figure 4:
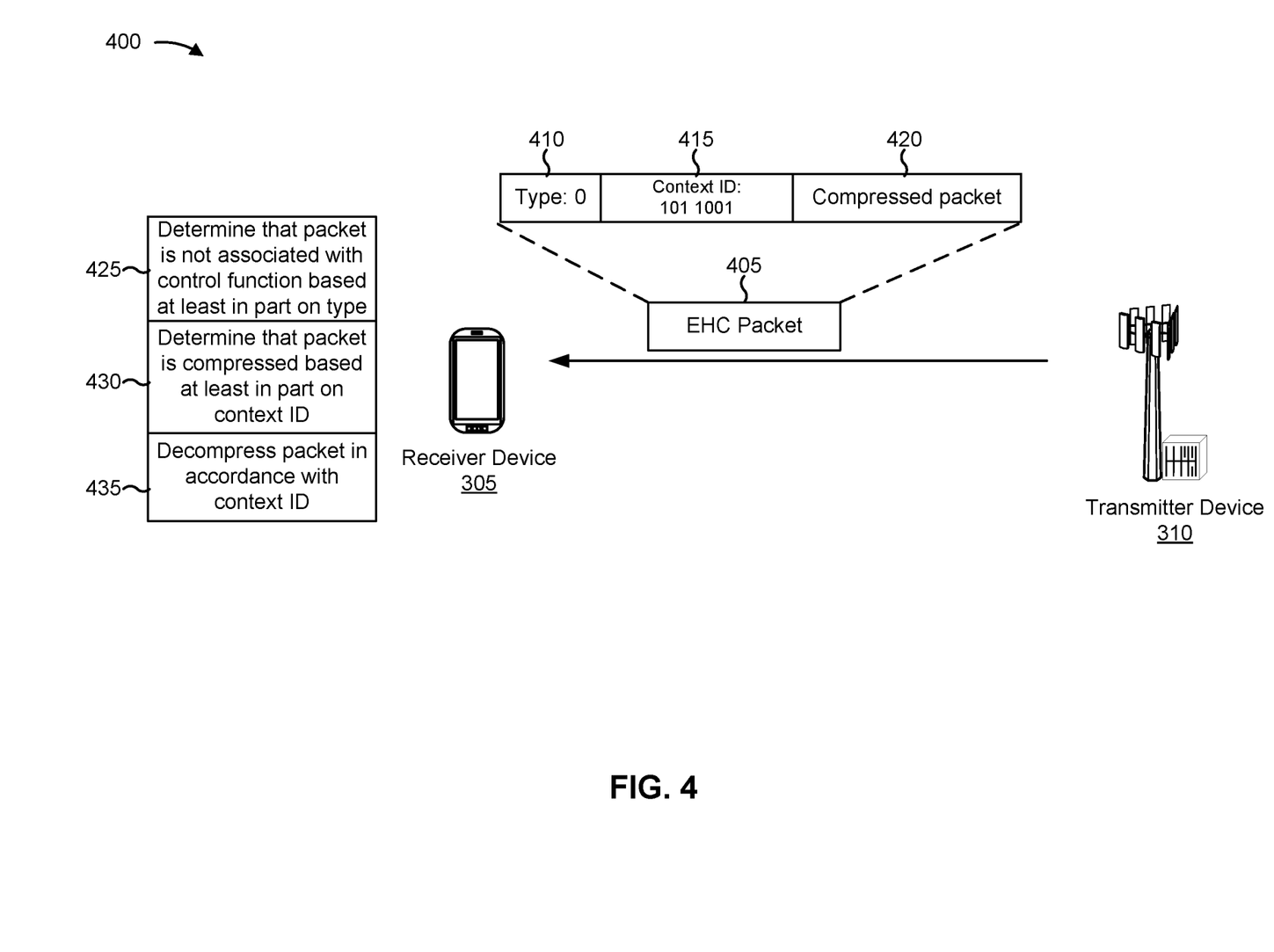
Figure 5:
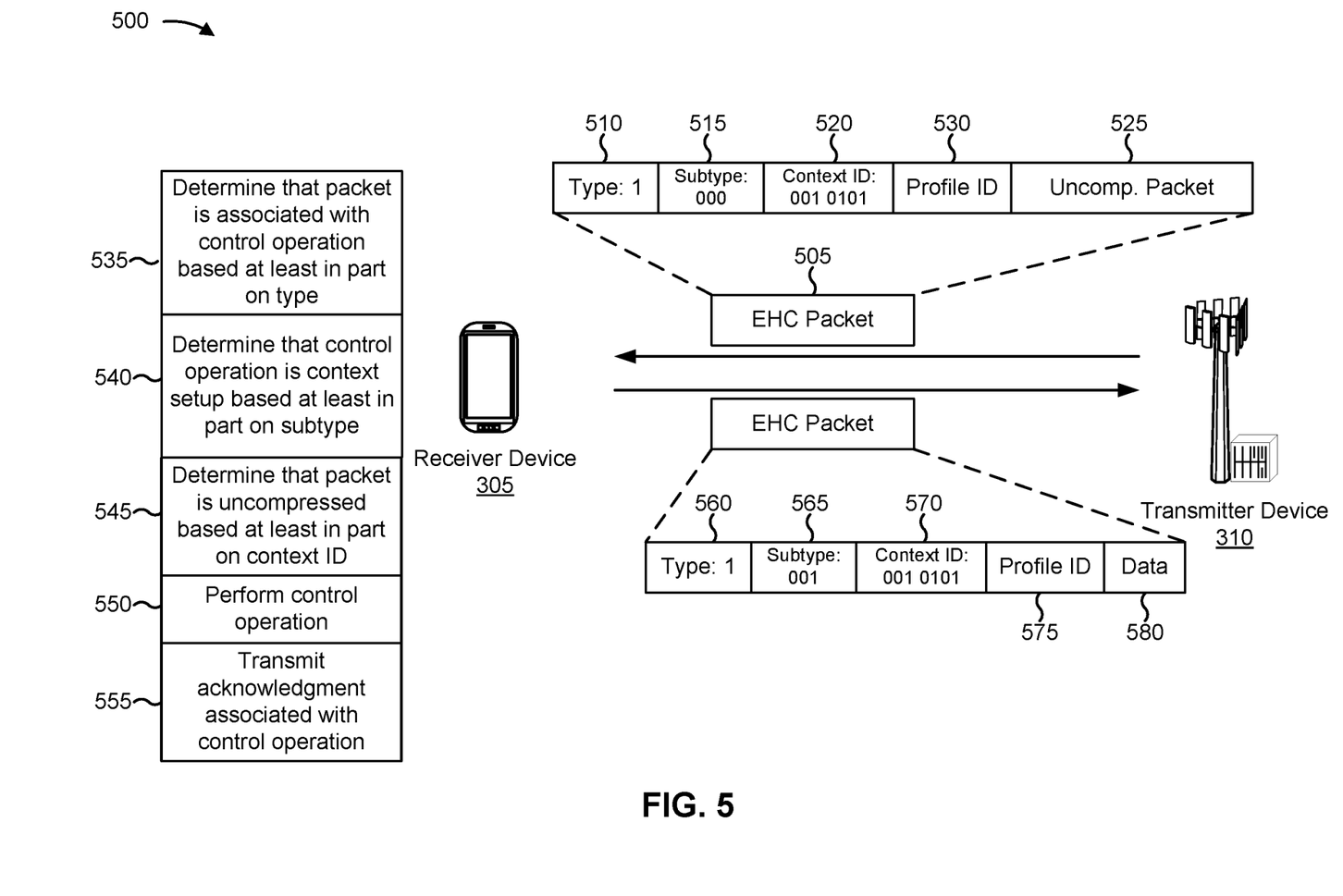

FIGS. 3-5 are diagrams illustrating examples 300, 400, and 500 for header compression formats for indication of compression and control operations, in accordance with various aspects of the present disclosure. As shown, examples 300, 400, and 500 include a receiver device 305 and a transmitter device 310. While the receiver device 305 and the transmitter device 310 are shown as a user device and a base station, respectively, devices 305 and 310 can include any device capable of communicating using a header compression protocol (e.g., UE 120, BS 110, or a different type of device). In some aspects, receiver device 305 may be referred to as a decompressor and transmitter device 310 may be referred to as a compressor, though the operations described in connection with FIGS. 3-5 can be performed where the receiver device 305 is a compressor and the transmitter device 310 is a decompressor, or where both the receiver device 305 and the transmitter device 310 each function as a compressor and a decompressor.

As shown in FIG. 3, the receiver device 305 may receive a header compression packet 315 (shown as and sometimes referred to hereinafter as an EHC packet 315) from the transmitter device 310. The EHC packet 315 may include a header compression header, shown by reference numbers 320 and 325, and a payload 330. Here, the payload 330 includes an uncompressed packet. For example, when the packet 315 is an EHC packet, the payload 330 may include an Ethernet packet. In some aspects, the payload 330 may be a PDCP data protocol data unit (PDU).

As used herein, a compressed packet may refer to a packet that is at least partially compressed. For example, a compressed packet may include a packet of which at least one of a header, a trailer, a payload, a part of a payload, a part of a header, a part of a trailer, and/or the like, has been compressed. An uncompressed packet may refer to a packet that has not been compressed.

As shown by reference number 320, the packet 315 may include a bit indicating a type of the packet. For example, a first bit value (e.g., 0) may indicate that the packet is not associated with a control operation, and a second bit value (e.g., 1) may indicate that the packet is associated with a control operation. As shown by reference number 325, the header compression packet 315 may include a context identifier. For a compressed packet (e.g., if the uncompressed packet were compressed), the context identifier may identify a context associated with the compressed packet. The context for a compressed packet is described in more detail in connection with FIG. 4. In this case, the context identifier has a particular value that indicates that the payload 330 is an uncompressed packet (e.g., 111 1111, though any bit string may be implemented as the particular value). In other words, if the context identifier has the particular value, then the receiver device 305 may determine that a corresponding packet is uncompressed, and if the context identifier has a value other than the particular value, then the receiver device 305 may determine that the corresponding packet is compressed. This may conserve resources of the header of the EHC packet 315 in comparison to using a bit to indicate whether the packet is compressed.

In some aspects, the compressor (e.g., transmitter device 310) may be configured not to transmit a control operation packet (e.g., a context create packet, a context delete packet, and/or the like) with the particular value of the context identifier. In some aspects, the decompressor (e.g., receiver device 305) may treat a control operation packet with the particular value of the context identifier as an error case.

As shown by reference number 335, the receiver device 305 may determine that the EHC packet 315 is not associated with a control operation, based at least in part on the bit indicated by reference number 320 having the first value. As shown by reference number 340, the receiver device 305 may determine that the payload 330 is an uncompressed packet based at least in part on the context identifier having the particular value. Accordingly, as shown by reference number 345, the receiver device 305 may provide the payload 330 to a higher layer (e.g., without attempting to decompress the packet) based at least in part on the packet being uncompressed. Thus, resources are conserved that would otherwise be used to attempt to decompress the uncompressed packet.

Example 400, shown in FIG. 4, is an example where the packet (e.g., the payload of the EHC packet 405) is compressed. As shown, the header of the EHC packet 405 includes a context identifier 410 indicating that the EHC packet 405 is not associated with a control operation. Here, the context identifier 410 is not associated with the particular value described in connection with example 300, indicating that the packet 420 is compressed. For example, when the packet 420 is compressed, then the context identifier 410 may identify a context associated with the compressed packet 420. The context may identify a state used to compress or decompress a packet. The context may indicate relevant information from previous headers in a packet flow, such as static fields and possible reference values for compression and decompression. In some aspects, the context may indicate additional information regarding the packet flow, such as information about a change behavior of one or more fields (e.g., an Internet Protocol Identifier behavior, a typical inter-packet increase in sequence number and timestamp, and/or the like).

As shown by reference number 425, the receiver device 305 may determine that the EHC packet 405 is not associated with a control operation (e.g., is associated with a non-control operation) based at least in part on the bit indicating the type of the EHC packet 405. As shown by reference number 430, the receiver device 305 may determine that the packet 420 is compressed based at least in part on the context identifier (e.g., based at least in part on the context identifier not having the particular value described in connection with example 300). Accordingly, as shown by reference number 435, the receiver device 305 may decompress the packet in accordance with the context identifier (e.g., using a context indicated by the context identifier). In this way, the context identifier is used to indicate whether or not a packet is compressed and a context associated with a compressed packet, thereby reducing overhead that would otherwise be caused by a dedicated bit being used to indicate whether the packet is compressed.

Example 500, shown in FIG. 5, is an example where the EHC packet 505 is associated with a control operation. For example, as shown by reference number 510, a bit indicating the type of the EHC packet 505 may indicate that the EHC packet 505 is associated with a control operation. The control operation is indicated by the subtype value shown by reference number 515. For example, a first value of the subtype value may indicate a context setup operation, a second value of the subtype value may indicate a context setup acknowledgment operation, a third value of the subtype value may indicate a context deletion operation, and a fourth value of the subtype value may indicate a context deletion acknowledgment. Here, the subtype is associated with a context setup operation. In some aspects, the subtype value may be included in the header of the EHC packet 505. In some aspects, the subtype value may be included in a payload 525 of the EHC packet 505.

As shown by reference number 520, a context identifier of the EHC packet 505 may be associated with a value other than the particular value, since the particular value is used to indicate an uncompressed packet for which a new context is not being created. The payload 525 may carry information defining or relating to the context. Here, the EHC packet 505, when associated with a control operation, can carry a payload 525. The profile identifier shown by reference number 530 may identify a profile for a context to be created based at least in part on the EHC packet 505.

As shown by reference number 535, the receiver device 305 may determine that the EHC packet 505 is associated with a control operation based at least in part on the type. As shown by reference number 540, the receiver device 305 may determine that the control operation is a context setup operation based at least in part on the subtype. As shown by reference number 545, the receiver device 305 may determine that the packet is uncompressed based at least in part on the context identifier. As shown by reference number 550, the receiver device 305 may perform the control operation indicated by the subtype. In some aspects, the receiver device 305 may provide the payload 525 to a higher layer of the receiver device 305.

In some aspects, as shown by reference number 555, the receiver device 305 may provide feedback to the transmitter device 310 based at least in part on an EHC packet 505. For example, the receiver device 305 may provide an EHC packet or another form of communication indicating the feedback. As shown, the EHC packet may include information indicating a type (shown by reference number 560) associated with a control operation, a subtype value (shown by reference number 565) indicating that the EHC packet is associated with an acknowledgment of a control operation such as a context setup, a context identifier (shown by reference number 570) indicating the context associated with the acknowledgment, a profile identifier (shown by reference number 575), and/or a data payload (shown by reference number 580). For example, the receiver device 305 may transmit a feedback packet following reception of a packet indicating a context setup or a context deletion. In some aspects, the packet may indicate a context setup or a context deletion based at least in part on a context identifier of the packet having a non-zero value. In some aspects, the receiver device 305 may transmit the acknowledgment associated with the control operation without having determined whether a corresponding packet (e.g., EHC packet 505) is uncompressed based at least in part on a context identifier associated with the corresponding packet.

As indicated above, FIGS. 3-5 are provided as one or more examples. Other examples may differ from what is described with respect to FIGS. 3-5.

Figure 6:
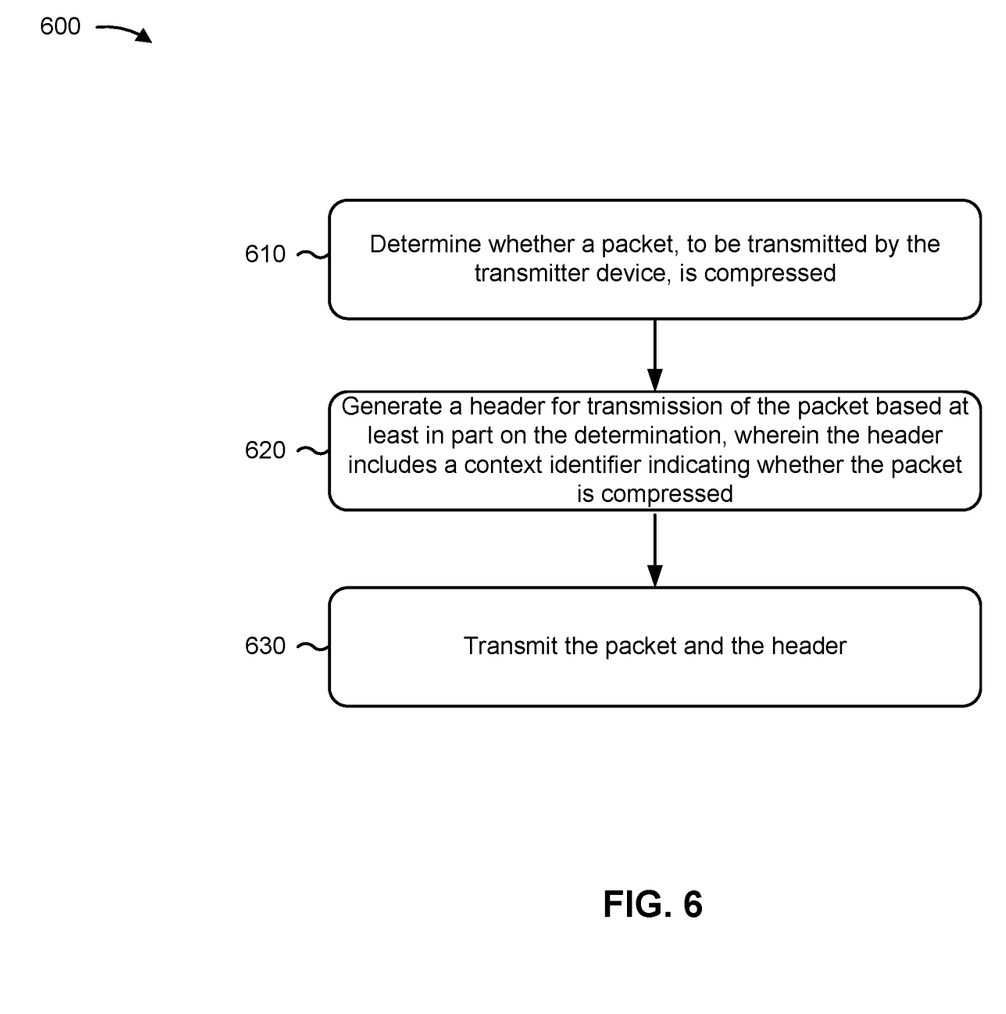
FIG. 6 is a diagram illustrating an example process performed, for example, by a transmitter device, in accordance with various aspects of the present disclosure.

FIG. 6 is a diagram illustrating an example process 600 performed, for example, by a transmitter device, in accordance with various aspects of the present disclosure. Example process 600 is an example where the transmitter device (e.g., transmitter device 310, UE 120, BS 110, and/or the like) performs operations associated with a context identifier for Ethernet packet compression.

As shown in FIG. 6, in some aspects, process 600 may include determining whether a packet, to be transmitted by the transmitter device, is compressed (block 610). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may determine whether a packet, to be transmitted by the transmitter device, is compressed, as described above.

As further shown in FIG. 6, in some aspects, process 600 may include generating a header for transmission of the packet based at least in part on the determination, wherein the header includes a context identifier indicating whether the packet is compressed (block 620). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may generate a header for transmission of the packet based at least in part on the determination, as described above. In some aspects, the header includes a context identifier indicating whether the packet is compressed.

As further shown in FIG. 6, in some aspects, process 600 may include transmitting the packet and the header (block 630). For example, the transmitter device (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit the packet and the header, as described above.

Process 600 may include additional aspects, such as any single aspect or any combination of aspects described below and/or in connection with one or more other processes described elsewhere herein.

In a first aspect, process 600 includes determining, prior to determining whether the packet is compressed, whether the header is to be associated with a control operation or a non-control operation, wherein generating the header further comprises generating the header including a bit value indicating whether the header is associated with the control operation or the non-control operation.

In a second aspect, alone or in combination with the first aspect, the control operation includes at least one of: a context setup operation, an acknowledgment associated with a context setup operation, a context deletion operation, or an acknowledgment associated with a context deletion operation.

In a third aspect, alone or in combination with one or more of the first and second aspects, when the header is associated with the control operation, the context identifier indicates the control operation.

In a fourth aspect, alone or in combination with one or more of the first through third aspects, the packet is transmitted as a payload associated with the header.

In a fifth aspect, alone or in combination with one or more of the first through fourth aspects, the packet is associated with an Ethernet protocol.

In a sixth aspect, alone or in combination with one or more of the first through fifth aspects, the header is or comprises an Ethernet Header Compression header.

In a seventh aspect, alone or in combination with one or more of the first through sixth aspects, the context identifier indicates that the packet is compressed when the context identifier comprises a particular bit sequence.

In an eighth aspect, alone or in combination with one or more of the first through seventh aspects, when the packet is not compressed, the context identifier indicates a compression or decompression state for the packet.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
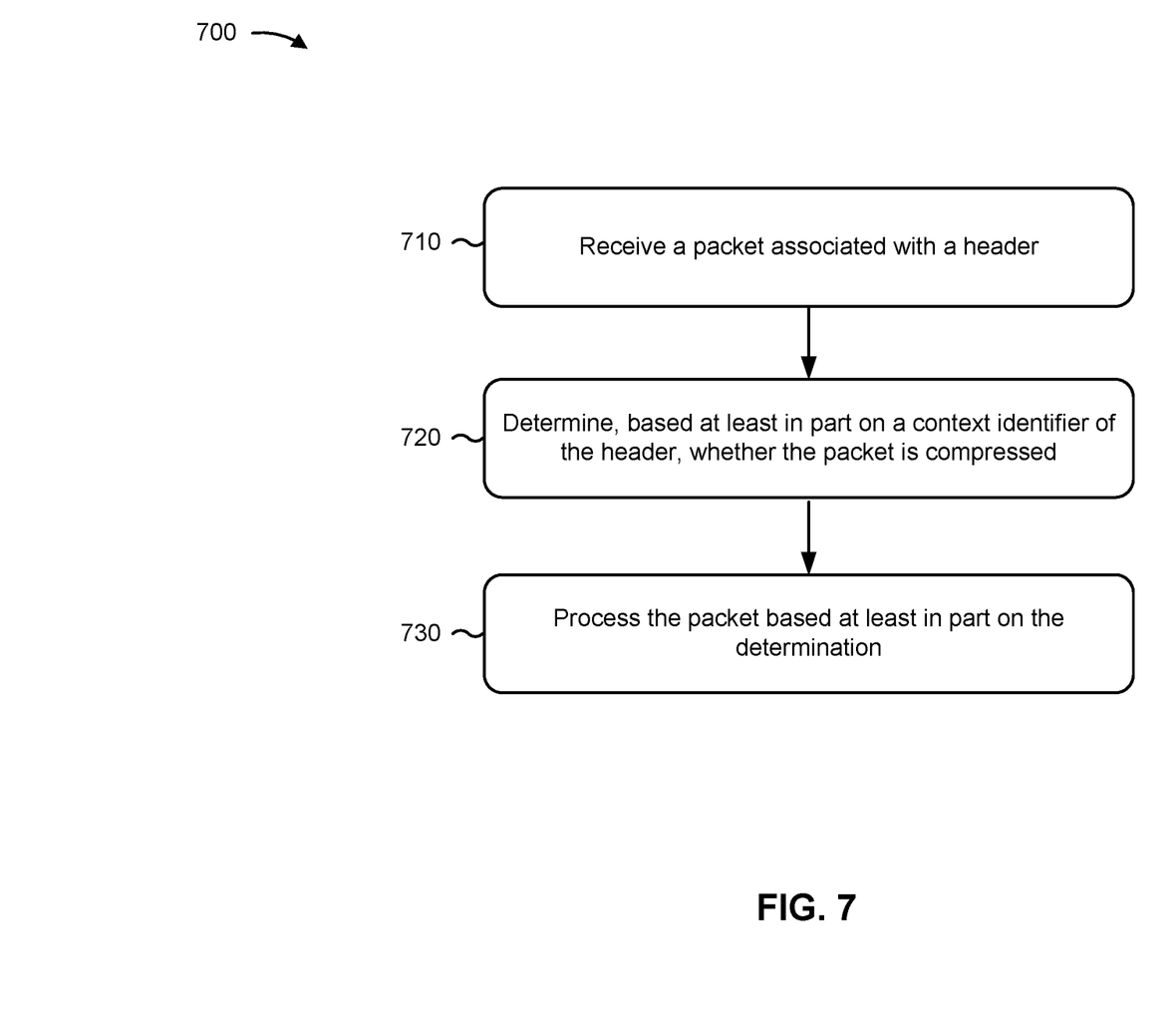
FIG. 7 is a diagram illustrating an example process performed, for example, by a receiver device, in accordance with various aspects of the present disclosure.

FIG. 7 is a diagram illustrating an example process 700 performed, for example, by a receiver device, in accordance with various aspects of the present disclosure. Example process 700 is an example where the receiver device (e.g., receiver device 305, UE 120, BS 110 and/or the like) performs operations associated with a context identifier for Ethernet packet compression.

As shown in FIG. 7, in some aspects, process 700 may include receiving a packet associated with a header (block 710). For example, the receiver device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may receive a packet associated with a header, as described above.

As further shown in FIG. 7, in some aspects, process 700 may include determining, based at least in part on a context identifier of the header, whether the packet is compressed (block 720). For example, the receiver device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may determine, based at least in part on a context identifier of the header, whether the packet is compressed, as described above.

As further shown in FIG. 7, in some aspects, process 700 may include processing the packet based at least in part on the determination (block 730). For example, the receiver device (e.g., using antenna 234, DEMOD 232, MIMO detector 236, receive processor 238, controller/processor 240, antenna 252, DEMOD 254, MIMO detector 256, receive processor 258, controller/processor 280, and/or the like) may process the packet based at least in part on the determination, as described above.

Process 700 may include additional aspects, such as any single aspect or any combination of aspects described below and/or in connection with one or more other processes described elsewhere herein.

In a first aspect, process 700 includes determining whether the header is associated with a control operation or a non-control operation based at least in part on a bit value, included in the header, indicating whether the header is associated with the control operation or the non-control operation.

In a second aspect, alone or in combination with the first aspect, the control operation includes at least one of: a context setup operation, an acknowledgment associated with a context setup operation, a context deletion operation, or an acknowledgment associated with a context deletion operation.

In a third aspect, alone or in combination with one or more of the first and second aspects, when the header is associated with the control operation, the context identifier indicates the control operation.

In a fourth aspect, alone or in combination with one or more of the first through third aspects, process 700 includes performing the control operation or the non-control operation.

In a fifth aspect, alone or in combination with one or more of the first through fourth aspects, the packet is received as a payload associated with the header.

In a sixth aspect, alone or in combination with one or more of the first through fifth aspects, the packet is associated with an Ethernet protocol.

In a seventh aspect, alone or in combination with one or more of the first through sixth aspects, the header is or comprises an Ethernet Header Compression header.

In an eighth aspect, alone or in combination with one or more of the first through seventh aspects, the context identifier indicates that the packet is compressed when the context identifier comprises a particular bit sequence.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
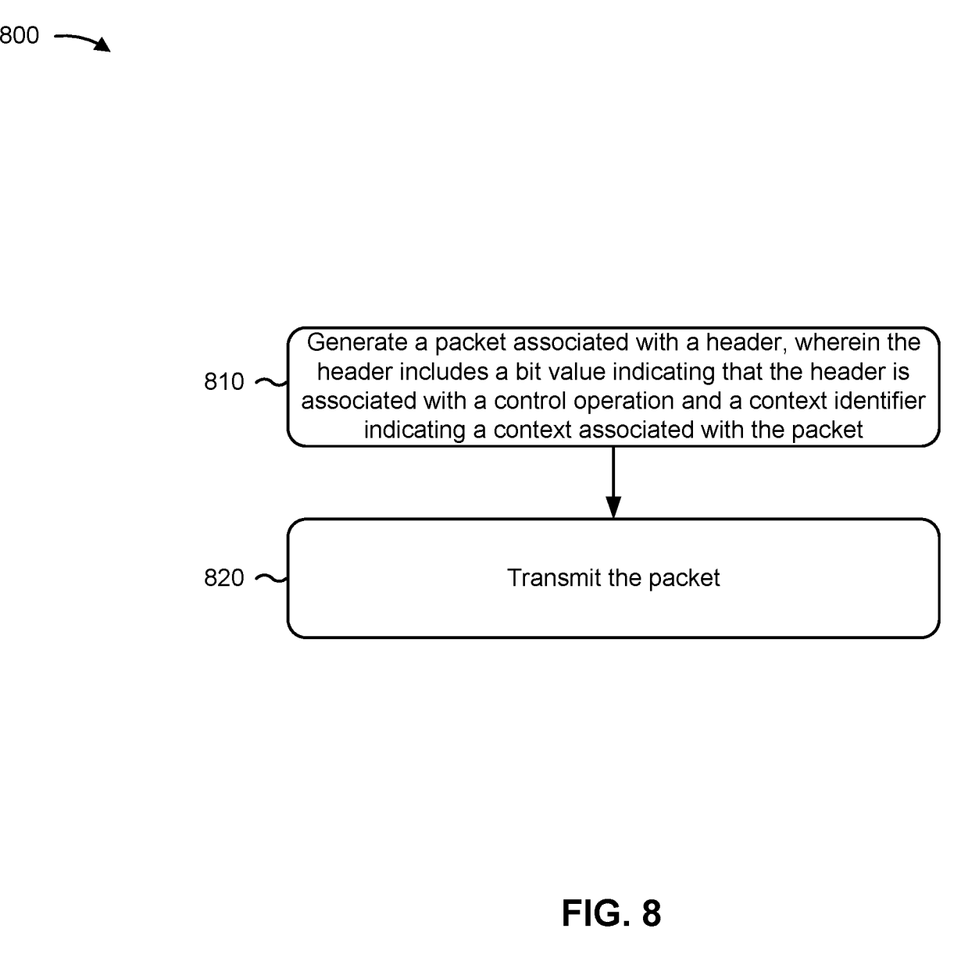
FIG. 8 is a diagram illustrating an example process performed, for example, by a wireless communication device, in accordance with various aspects of the present disclosure.

FIG. 8 is a diagram illustrating an example process 800 performed, for example, by a wireless communication device, in accordance with various aspects of the present disclosure. Example process 800 is an example where the wireless communication device (e.g., UE 120, BS 110, receiver device 305, transmitter device 310, or the like) performs operations associated with a context identifier for packet compression.

As shown in FIG. 8, in some aspects, process 800 may include generating a packet associated with a header, wherein the header includes a bit value indicating that the header is associated with a control operation and a context identifier indicating a context associated with the packet (block 810). For example, the wireless communication device (e.g., using transmit processor 220, TX MIMO processor 230, modulator 232, antenna 234, demodulator 232, MIMO detector 236, receive processor 238, controller/processor 240, memory 242, and/or scheduler 246; and/or using antenna 252, demodulator 254, MIMO detector 256, receive processor 258, transmit processor 264, TX MIMO processor 266, modulator 254, controller/processor 280, and/or memory 282) may generate a packet associated with a header. The header may include a bit value indicating that the header is associated with a control operation and a context identifier indicating a context associated with the packet, as described above.

As further shown in FIG. 8, in some aspects, process 800 may include transmitting the packet (block 820). For example, the wireless communication device (e.g., using transmit processor 220, TX MIMO processor 230, modulator 232, antenna 234, controller/processor 240, memory 242, and/or scheduler 246; and/or using antenna 252, transmit processor 264, TX MIMO processor 266, modulator 254, controller/processor 280, and/or memory 282) may transmit the packet, as described above.

Process 800 may include additional aspects, such as any single aspect or any combination of aspects described below and/or in connection with one or more other processes described elsewhere herein, such as process 600 of FIG. 6 or process 700 of FIG. 7.

In a first aspect, the control operation includes transmitting an acknowledgment associated with a context setup or a context deletion associated with the context identifier.

In a second aspect, alone or in combination with the first aspect, the packet is a first packet and wherein the method further comprises receiving, prior to transmitting the first packet, a second packet, wherein the second packet indicates the context setup or the context deletion.

In a third aspect, alone or in combination with one or more of the first and second aspects, the packet includes a data payload.

In a fourth aspect, alone or in combination with one or more of the first through third aspects, the header is or comprises an Ethernet Header Compression header.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   determining whether a packet, to be transmitted by the transmitter device, is compressed;
   generating a header for transmission of the packet based at least in part on the determination, wherein the header includes a context identifier indicating whether the packet is compressed, wherein the context identifier is stored in a context identifier field and wherein the header is or comprises an Ethernet Header Compression header and
   determining, prior to determining whether the packet is compressed, whether the header is to be associated with a control operation or a non-control operation,
   wherein generating the header further comprises:
   generating the header including a bit value indicating whether the header is associated with the control operation or the non-control operation, wherein the bit value is stored in a bit value field; and
   transmitting the packet and the header.

2. The method of claim 1, wherein the control operation includes at least one of:
   a context setup,
   an acknowledgment associated with a context setup,
   a context deletion, or
   an acknowledgment associated with a context deletion.

3. The method of claim 1, wherein, when the header is associated with the control operation, the context identifier indicates the control operation.

4. The method of claim 1, wherein the packet is transmitted as a payload associated with the header.

5. The method of claim 1, wherein the packet is associated with an Ethernet protocol.

6. The method of claim 1, wherein the context identifier indicates that the packet is compressed when the context identifier comprises a particular bit sequence.

7. The method of claim 1, wherein, when the packet is not compressed, the context identifier indicates a compression or decompression state for the packet.

8. A method of wireless communication performed by a receiver device, comprising:
   receiving a packet associated with a header;
   determining, based at least in part on a context identifier of the header, whether the packet is compressed, wherein the context identifier is stored in a context identifier field and wherein the header is or comprises an Ethernet Header Compression header;
   determining whether the header is associated with a control operation or a non-control operation based at least in part on a bit value, included in the header, indicating whether the header is associated with the control operation or the non-control operation, wherein the bit value is stored in a bit value field; and
   processing the packet based at least in part on the determination.

9. The method of claim 8, wherein the control operation includes at least one of:
a context setup,
an acknowledgment associated with a context setup,
a context deletion, or
an acknowledgment associated with a context deletion.

10. The method of claim 8, wherein, when the header is associated with the control operation, the context identifier indicates the control operation.

11. The method of claim 8, further comprising:
performing the control operation or the non-control operation.

12. The method of claim 8, wherein the packet is received as a payload associated with the header.

13. The method of claim 8, wherein the packet is associated with an Ethernet protocol.

14. The method of claim 8, wherein the context identifier indicates that the packet is compressed when the context identifier comprises a particular bit sequence.

15. A transmitter device for wireless communication, comprising:
a memory; and
one or more processors operatively coupled to the memory, the memory and the one or more processors configured to:
determine whether a packet, to be transmitted by the transmitter device, is compressed;
generate a header for transmission of the packet based at least in part on the determination,
wherein the header includes a context identifier indicating whether the packet is compressed, wherein the context identifier is stored in a context identifier field and wherein the header is or comprises an Ethernet Header Compression header;
determining, prior to determining whether the packet is compressed, whether the header is to be associated with a control operation or a non-control operation,
wherein generating the header further comprises:
generating the header including a bit value indicating whether the header is associated with the control operation or the non-control operation, wherein the bit value is stored in a bit value field; and
transmit the packet and the header.

16. The transmitter device of claim 15, wherein the control operation includes at least one of:
a context setup,
an acknowledgment associated with a context setup,
a context deletion, or
an acknowledgment associated with a context deletion.

17. The transmitter device of claim 15, wherein, when the header is associated with the control operation, the context identifier indicates the control operation.

18. The transmitter device of claim 15, wherein the packet is transmitted as a payload associated with the header.

19. The transmitter device of claim 15, wherein the packet is associated with an Ethernet protocol.

* * * * *